US010998822B2

(12) United States Patent
Kanakasabai et al.

(10) Patent No.: US 10,998,822 B2
(45) Date of Patent: May 4, 2021

(54) POWER TRANSFER DEVICE WITH A PLURALITY OF CONVERTERS

(71) Applicant: General Electric Company, Schenectady, NY (US)

(72) Inventors: Viswanathan Kanakasabai, Bangalore (IN); Satishbabu Bhogineni, Chennai (IN); Rahul Bhujade, Bangalore (IN); Arun Raghunathan, Bangalore (IN); Suma Memana Narayana Bhat, Bangalore (IN); Somakumar Ramachandrapanicker, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/616,395

(22) PCT Filed: Apr. 19, 2018

(86) PCT No.: PCT/US2018/028229
§ 371 (c)(1),
(2) Date: Nov. 22, 2019

(87) PCT Pub. No.: WO2018/217336
PCT Pub. Date: Nov. 29, 2018

(65) Prior Publication Data
US 2020/0244174 A1   Jul. 30, 2020

(30) Foreign Application Priority Data

May 26, 2017   (IN) .............................. 201741018544

(51) Int. Cl.
*H02M 3/335*   (2006.01)
*H02J 50/40*   (2016.01)
(Continued)

(52) U.S. Cl.
CPC ......... *H02M 3/33569* (2013.01); *H02J 50/10* (2016.02); *H02J 50/40* (2016.02); *H04B 5/0037* (2013.01)

(58) Field of Classification Search
CPC .............. H02M 3/33569; H02M 3/337; H02J 50/40–402; H02J 50/10
See application file for complete search history.

(56) References Cited

U.S. PATENT DOCUMENTS 9,502,922 B2 * 11/2016 Hasegawa ............... H02J 7/025
10,256,666 B2 * 4/2019 Jung ....................... H02J 50/12
(Continued)

FOREIGN PATENT DOCUMENTS

JP   2014-180078 A   9/2014
KR  10-2016-0100755 A   8/2016
(Continued)

OTHER PUBLICATIONS

International Search Report issued in connection with PCT/US2018/028229 dated Jul. 24, 2018.
(Continued)

*Primary Examiner* — Thienvu V Tran
*Assistant Examiner* — Sisay G Tiku
(74) *Attorney, Agent, or Firm* — DeLizio Law, PLLC

(57) ABSTRACT

A power transfer device and an associated method thereof are disclosed. The power transfer device includes a driver unit having a plurality of converters. The driver unit includes a plurality of legs forming ones of the plurality of converters, such that at least one leg of a first converter of the plurality of converters is common to a second converter of the plurality of converters. Each converter of the plurality of converters includes an output terminal. The driver unit may include a plurality of transmitter coils. In some implemen-
(Continued)

tations, a different transmitter coil is coupled to each output terminal of a respective converter.

18 Claims, 6 Drawing Sheets

(51) Int. Cl.
*H02M 7/5387* (2007.01)
*H02J 50/10* (2016.01)
*H04B 5/00* (2006.01)

(56) References Cited

U.S. PATENT DOCUMENTS

| | | | |
|---|---|---|---|
| 10,263,471 B2* | 4/2019 | Maniktala | H02J 50/40 |
| 10,523,062 B2 | 12/2019 | Bae | |
| 2013/0208521 A1 | 8/2013 | Trainer et al. | |
| 2013/0257360 A1* | 10/2013 | Singh | H02J 50/12 |
| | | | 320/108 |
| 2016/0043567 A1* | 2/2016 | Matsumoto | H02J 7/025 |
| | | | 307/104 |
| 2016/0241087 A1 | 8/2016 | Bae | |
| 2016/0285278 A1* | 9/2016 | Mehas | H02J 50/12 |
| 2017/0271923 A1* | 9/2017 | Kim | H02J 50/12 |
| 2018/0152051 A1* | 5/2018 | Kim | H02M 1/36 |
| 2018/0323637 A1* | 11/2018 | Katabi | H04B 5/0037 |
| 2019/0089197 A1* | 3/2019 | Mao | H01F 3/14 |
| 2019/0214852 A1* | 7/2019 | Park | H02J 50/40 |
| 2019/0272943 A1* | 9/2019 | Leem | H02J 7/02 |
| 2020/0006986 A1* | 1/2020 | Kim | H02J 7/02 |

FOREIGN PATENT DOCUMENTS

| | | | |
|---|---|---|---|
| KR | 10-2016-0125983 A | 11/2016 | |
| KR | 10-2017-0002903 A | 1/2017 | |
| WO | WO-2019133803 A1 * | 7/2019 | H02J 50/12 |

OTHER PUBLICATIONS

"India Application No. 201741018544 Examination Report", Nov. 22, 2019, 6 pages.

* cited by examiner

POWER TRANSFER DEVICE WITH A PLURALITY OF CONVERTERS

BACKGROUND

Embodiments of the present invention relate generally to power transfer systems and more particularly to a power transfer device of a power transfer system.

The power transfer device is realized using multiple transmitter coils. Typically, a dedicated power electronic driver unit may be employed for exciting each of the multiple transmitter coils. Accordingly, the number of power electronic devices employed is high, thereby increasing the power electronic foot print. Also, the cost of the power transfer systems is considerably higher due to use of higher number of power electronic devices.

In a conventional system, a single high current capacity power electronic driver unit may be employed to excite all transmitter coils together. All transmitter coils may be excited even when corresponding receiver devices are not present. The excitation of all the transmitter coils together causes unnecessary electromagnetic interference and power losses. Accordingly, efficiency of the power transfer system is reduced.

Thus, there is a need for an enhanced power transfer device and as associated method.

BRIEF DESCRIPTION

In accordance with one embodiment of the present invention, a power transfer device is disclosed. The power transfer device includes a driver unit. The driver unit includes a plurality of converters including a plurality of legs coupled to each other, where at least one leg of each of the plurality of converters is common to another power converter of the plurality of converters, and where each of the plurality of converters includes an output terminal. Further, the driver unit includes at least one transmitter coil, where the at least one transmitter coil is coupled to the corresponding output terminal.

In accordance with another embodiment of the present invention, a power transfer system is disclosed. The power transfer system includes a driver unit, where the driver unit includes a plurality of converters including a plurality of legs coupled to each other. At least one leg of each of the plurality of converters is common to another converter of the plurality of converters. Each of the plurality of converters includes an output terminal, and at least one transmitter coil, where the at least one transmitter coil is coupled to the corresponding output terminal. Further, the power transfer system includes a control unit coupled to the driver unit, where the control unit is configured to regulate switching of the driver unit.

In accordance with another embodiment of the present invention, a method of operating a power transfer system is disclosed. The method includes detecting by a control unit, at least one receiver coil disposed proximate to at least one transmitter coil of a driver unit of a power transfer device, where the driver unit further includes a plurality of converters including a plurality of legs coupled to each other. At least one leg of each of the plurality of converters is common to another converter of the plurality of converters. Each of the plurality of converters includes an output terminal, and where at least one transmitter coil is coupled to the corresponding output terminal. Further, the method includes determining by the control unit, respective switching frequencies of the plurality of converters. Also, the method includes determining by the control unit, respective switching patterns of the plurality of converters based on the detected at least one receiver coil. Switching by the control unit, the plurality of converters, based on the determined respective switching frequencies and the determined respective switching patterns to generate an output parameter having a determined value at the output terminal of each of the plurality of converters.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

As will be described in detail hereinafter, various embodiments of a power transfer system are disclosed. In particular, the system and method disclosed herein employ multiple converters, where each converter shares at least one leg with another converter. Further, the embodiments disclose selectively driving different frequency coils and thereby enabling charging of receiver devices designed based on different frequency standards. The receiver devices may include but not limited to a mobile phone, a laptop, and the like.

Unless defined otherwise, technical and scientific terms used herein have the same meaning as is commonly understood by one of ordinary skill in the art to which this specification belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, terms "circuit" and "circuitry" and "controlling unit" may include either a single component or a plurality of components, which are either active and/or passive and are connected or otherwise coupled together to provide the described function. In addition, the term operationally coupled as used herein includes wired coupling, wireless coupling, electrical coupling, magnetic coupling, radio communication, software based communication, or combinations thereof.

Figure 1:
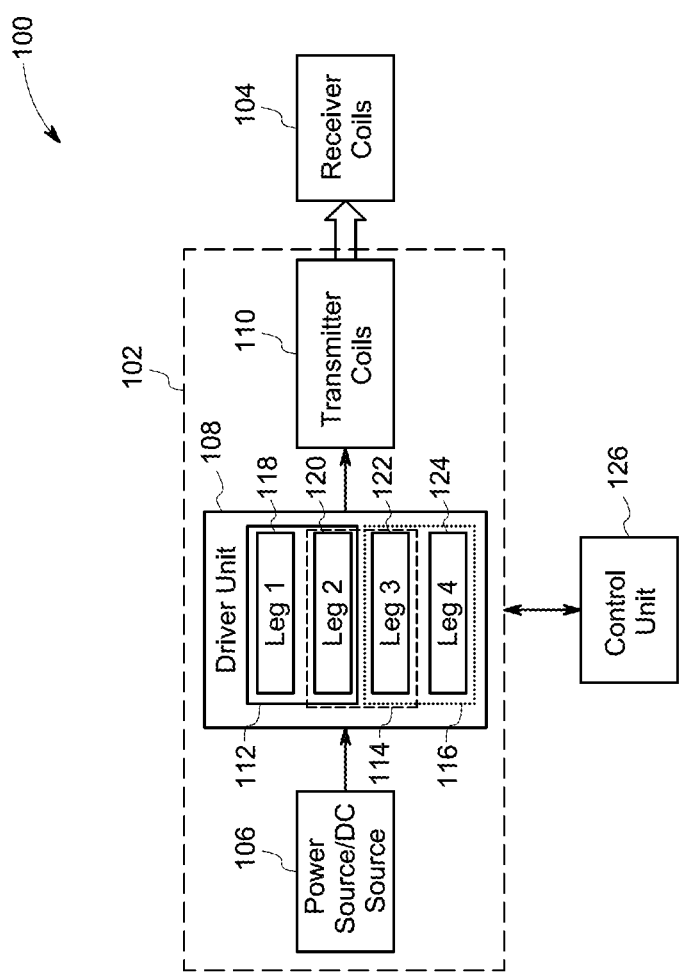
FIG. 1 is a block diagram representation of a power transfer system in accordance with an embodiment of the present invention.

FIG. 1 is a diagrammatical representation of a power transfer system 100 in accordance with an embodiment of the present invention. The power transfer system 100 is used to transmit electrical power and/or electrical energy to receiver devices (not shown in FIG. 1) such as mobile devices, biomedical devices, induction cooktop, induction furnaces, and other portable consumer devices. The power transfer system 100 may also be referred to as a wireless power transfer system or a contactless power transfer system.

In one embodiment, the power transfer system 100 is a wireless charging system. The power transfer system 100 includes a power transfer device 102. Further, in one embodiment, the power transfer device 102 is a wireless charging device. It should be noted herein that the terms "power transfer system" and "wireless charging system," may be used interchangeably for the reference numeral 100. Similarly, the terms "power transfer device" and "wireless charging device," may be used interchangeably for the reference numeral 102.

In another embodiment, the power transfer system 100 may be an induction heating system used to energize receiver devices, such as, induction cooktop, induction furnaces and the like. In such an embodiment, the power transfer system 100 includes an induction heating device. Topology of the induction heating device is similar to that of topology of the wireless charging device 102. The term "topology," as used herein, refers to a circuit structure. However, the controls employed to operate the induction heating device may be different than the controls employed for the wireless charging device 102. The present specification describes a wireless charging system 100 in greater detail.

The wireless charging device 102 is wirelessly coupled to receiver coils 104. Further, the wireless charging device 102 is configured to transfer power to receiver coils 104 of the receiver devices, such as the mobile devices. The wireless charging device 102 includes a power source 106, a driver unit 108, and transmitter coils 110. The power source 106 is coupled to the driver unit 108. The driver unit 108 converts a direct current (DC) electrical parameter to an alternating current (AC) electrical parameter having a determined frequency. Further, the driver unit 108 is coupled to the transmitter coils 110. The transmitter coils 110 are inductively coupled to the corresponding receiver devices. The transmitter coils 110 are used to excite/power the receiver devices. Particularly, the transmitter coils 110 are inductively coupled to the corresponding receiver coils 104 and configured to excite/power the receiver coils 104. The number of transmitter coils 110 may vary depending on the application.

In one embodiment, the power source 106 is a DC source used to supply input power to the driver unit 108. In some embodiments, the input power may be in a range from about 1 W to 200 W. In one embodiment, the power source 106 may be integral to the wireless charging device 102. In another embodiment, the power source 106 may be positioned external to the wireless charging device 102.

In one embodiment, the transmitter coils 110 include high frequency transmitter coils and low frequency transmitter coils. In another embodiment, the transmitter coils 110 include either the high frequency transmitter coils or the low frequency transmitter coils.

It may be noted that the receiver coils 104 are compatible with a plurality wireless frequency standards respectively. For example, one of the receiver coils 104 may be compatible with Alliance for Wireless Power (A4WP)/Air fuel alliance (AFA) standard that is defined at a frequency of about 6.8 MHz. Similarly, another receiver coil 104 may be compatible with Wireless Power Consortium (WPC) standard (Qi) that is defined in a frequency range of 100 kHz to 200 kHz. Yet another receiver coil 104 may be compatible with Power Matters Alliance (PMA) standard that is defined in a frequency range of 200 kHz to 400 kHz. Some of the receiver coils 104 may be compatible with a low frequency standard, for example, WPC standard and PMA standard. Other receiver coils 104 are compatible with high frequency standard, for example, A4WP standard and AFA standard.

The receiver coils 104 compatible with a low frequency standard, may be excited by a low frequency transmitter coil among the transmitter coils 110. The receiver coils compatible with the low frequency standard may be referred to as a low frequency receiver coils. The receiver coils 104 compatible with a high frequency standard, may be excited by a high frequency transmitter coil among the transmitter coils 110. The receiver coils compatible with the high frequency standard may be referred to as high frequency receiver coils. In one embodiment, the low frequency transmitter coils may operate in a frequency range from about 100 kHz to about 400 kHz. In one embodiment, the high frequency transmitter coils may operate in a frequency range from about 6 MHz to about 7 MHz.

In the illustrated embodiment, the driver unit 108 includes a first converter 112, a second converter 114, and a third converter 116 operatively coupled to each other. The first converter 112 includes a first leg 118 and a second leg 120. The second converter 114 includes the second leg 120 and a third leg 122. The third converter 116 includes the third leg 122 and a fourth leg 124. The second leg 120 is common to the first converter 112 and the second converter 114. The third leg 122 is common to the second converter 114 and the third converter 116. In other words, electronics associated with the second leg 120 is common to the first and second converters 114. Similarly, electronics associated with the third leg 122 is common to the second converter 114 and the third converter 116. It should be noted herein that the number of legs shared between converters may vary depending on the application.

Each of the first leg 118, the second leg 120, the third leg 122, and the fourth leg 124 includes a plurality of switches (not shown in FIG. 1). Furthermore, each of the first converter 112, the second converter 114, and the third converter 116 includes a corresponding output terminal (not shown in FIG. 1). The transmitter coils 110 are operatively coupled to the corresponding output terminals. In another embodiment, a single transmitter coil 110 is coupled to one of the output terminals. In yet another embodiment, transmitter coils 110 which are arranged in parallel, may be coupled at one of the output terminals.

Furthermore, the wireless charging system 100 includes a control unit 126. The control unit 126 is operatively coupled to the wireless charging device 102. In one embodiment, the control unit 126 may be integral to the wireless charging device 102. In another embodiment, the control unit 126 may be positioned external to the wireless charging device 102. As used herein, the term "control unit" refers to integrated circuits referred to in the art as being included in a computer, but also refers to a controller, a microcontroller, a microcomputer, a programmable logic controller (PLC), a specification specific integrated circuit, specification-specific processors, digital signal processors (DSPs), Application Specific Integrated Circuits (ASICs), Field Programmable Gate Arrays (FPGAs), and/or any other programmable circuits.

The control unit 126 regulates operation of the first converter 112, the second converter 114, and third converter 116. In particular, the control unit 126 controls switching of the switches of first converter 112, the second converter 114, and third converter 116. Accordingly, an output parameter having voltage of a determined value/magnitude and a determined frequency is generated at each of the corresponding output terminal. In one embodiment, the output parameter is an alternating current (AC) parameter. When voltage at one output terminal is zero, one transmitter coil 110 which is coupled to the corresponding output terminal, is not excited. When the voltage having the determined value and the determined frequency is generated at a particular output terminal, transmitter coil 110 coupled to the corresponding output terminal is excited. Further, corresponding receiver coil 104 is powered based on the excitation of the corresponding transmitter coil 110.

Figure 2:
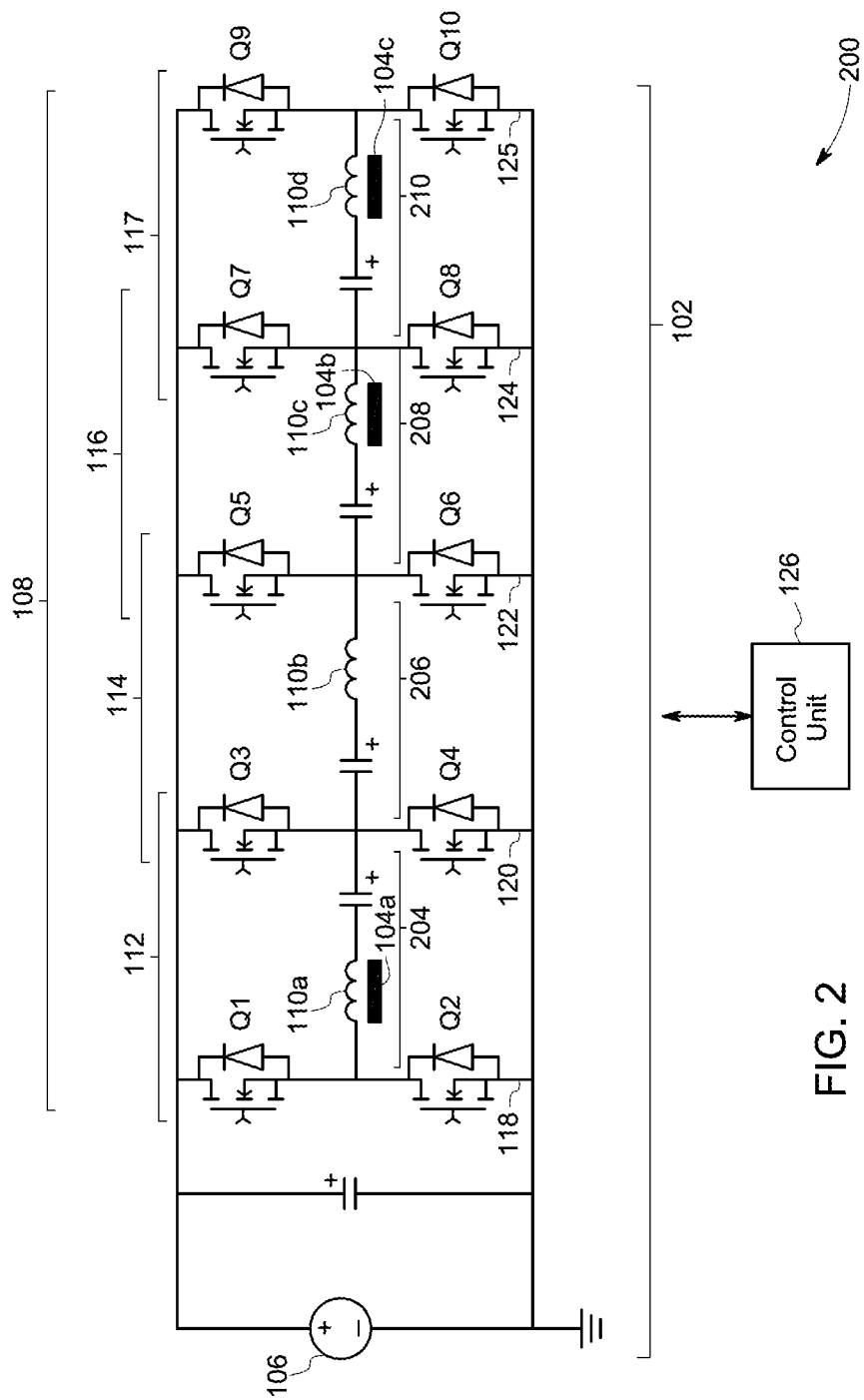
FIG. 2 is a schematic representation of a power transfer system in accordance with another embodiment of the present invention.

Referring to FIG. 2, a schematic representation of a power transfer system 200 in accordance with another embodiment of the present invention is depicted. Particularly, FIG. 2 represents a power transfer system 200 such as, a wireless charging system. It should be noted herein that the terms "power transfer system" and "wireless charging system," may be used interchangeably for the reference numeral 200.

The wireless charging system 200 includes the power source 106. The power source 106 is coupled to the driver unit 108. The driver unit 108 includes the first converter 112, the second converter 114, the third converter 116, and a fourth converter 117. The first converter 112 includes the first leg 118 and the second leg 120. The second converter 114 includes the second leg 120 and the third leg 122. The third converter 116 includes the third leg 122 and the fourth leg 124. The fourth converter 117 includes the fourth leg 124 and a fifth leg 125. The second leg 120 is common to the first converter 112 and the second converter 114. The third leg 122 is common to the second converter 114 and the third converter 116. The fourth leg 124 is common to the third converter 116 and the fourth converter 117. In one embodiment, each of the first converter 112, the second converter 114, the third converter 116, and the fourth converter 117 is a H-bridge circuit.

The first, second, third, fourth and fifth legs 118, 120, 122, 124, 125 include a plurality of switches $Q_1, Q_2, Q_3, Q_4, Q_5, Q_6, Q_7, Q_8, Q_9$, and $Q_{10}$. The plurality of switches $Q_1, Q_2, Q_3, Q_4, Q_5, Q_6, Q_7, Q_8, Q_9$, and $Q_{10}$ may be semiconductor switches. In one embodiment, the semiconductor switches $Q_1, Q_2, Q_3, Q_4, Q_5, Q_6, Q_7, Q_8, Q_9$, and $Q_{10}$ include an insulated gate bipolar transistor, a metal oxide semiconductor field effect transistor, a field-effect transistor, an injection enhanced gate transistor, an integrated gate commutated thyristor, or the like. In another embodiment, the semiconductor switches $Q_1, Q_2, Q_3, Q_4, Q_5, Q_6, Q_7, Q_8, Q_9$, and $Q_{10}$ include a gallium nitride based switch, a silicon carbide based switch, a gallium arsenide based switch, or the like.

The first converter 112 includes a first output terminal 204, the second converter 114 includes a second output terminal 206, the third converter 116 includes a third output terminal 208, and the fourth converter 117 includes a fourth output terminal 210.

In the illustrated embodiment, a first transmitter coil 110a is coupled to the first output terminal 204. Similarly, a second transmitter coil 110b, a third transmitter coil 110c, a fourth transmitter coil 110d are coupled to the second, third, and fourth output terminals 206, 208, and 210 respectively. In one embodiment, the first, second, third, and fourth transmitter coils 110a, 110b, 110c, and 110d are high frequency transmitter coils. In another embodiment, the first, second, third, and fourth transmitter coils 110a, 110b, 110c, 110d are low frequency transmitter coils. In yet another embodiment, the first, second, third, and fourth transmitter coils 110a, 110b, 110c, 110d include low frequency transmitter coils and high frequency transmitter coils.

The wireless charging system 200 includes the control unit 126. The control unit 126 is used to activate/deactivate the switches $Q_1, Q_2, Q_3, Q_4, Q_5, Q_6, Q_7, Q_8, Q_9$, and $Q_{10}$. Accordingly, an output parameter is generated at each of the first output terminal 204, the second output terminal 206, the third output terminal 208, and the fourth output terminal 210. Thereby, the first, second, third, and fourth transmitter coils 110a, 110b, 110c, and 110d are selectively excited.

In one embodiment, the first, second, third, and fourth transmitter coils 110a, 110b, 110c, and 110d are excited if a determined value of an AC voltage is applied across the each of the first, second, third, and fourth output terminals 204, 206, 208, 210. If the voltage across each of the first, second, third, and fourth output terminals 204, 206, 208, 210 is a zero value, the first, second, third, and fourth transmitter coils 110a, 110b, 110c, and 110d are not excited.

In the illustrated embodiment, a first receiver coil 104a is disposed proximate to the first transmitter coil 110a, a second receiver coil 104b is disposed proximate to the third transmitter coil 110c, and a third receiver coil 104c is disposed proximate to the fourth transmitter coil 110d. In another embodiment, the first receiver coil 104a is disposed on the first transmitter coil 110a, the second receiver coil 104b is disposed on the third transmitter coil 110c, and the third receiver coil 104c is disposed on the fourth transmitter coil 110d. Switching patterns of the switches of the first converter 112, the second converter 114, the third converter 116, and the fourth converter 117 are determined based on the position of each of the first, second, and third receiver coils 104a, 104b, 104c. The term "switching patterns" as used herein, refers to patterns at which the switches of the converters are activated or deactivated to excite/not excite corresponding transmitter coils.

Table (1) depicts the switching patterns of the switches corresponding to a condition where the first receiver coil 104a is disposed proximate to the first transmitter coil 110a, the second receiver coil 104b is disposed proximate to the third transmitter coil 110c, and the third receiver coil 104c is disposed proximate to the fourth transmitter coil 110d. $T_1$ and $T_2$ are time periods in seconds, where $T_1$ and $T_2$ are consecutive periods of time.

TABLE 1

| Time Period | $Q_1$ | $Q_2$ | $Q_3$ | $Q_4$ | $Q_5$ | $Q_6$ | $Q_7$ | $Q_8$ | $Q_9$ | $Q_{10}$ |
|---|---|---|---|---|---|---|---|---|---|---|
| $T_1$ | ON | OFF | OFF | ON | OFF | ON | ON | OFF | OFF | ON |
| $T_2$ | OFF | ON | ON | OFF | ON | OFF | OFF | ON | ON | OFF |

As depicted in table (1), the first transmitter coil 110a is excited when the switches $Q_1$ and $Q_4$ are in ON/OFF condition during a same time period. The term "ON," as used herein, refers to a condition when a switch is activated. The term "OFF," as used herein, refers to a condition when a switch is deactivated. Further, the switches $Q_2$ and $Q_3$ are in ON/OFF condition during a same time period and are switched complementary to switching of switches $Q_1$ and $Q_4$. In particular, during time period $T_1$, the switches $Q_1$ and $Q_4$ are in ON condition and the switches $Q_2$ and $Q_3$ are in OFF condition. In the subsequent time period $T_2$, the switches $Q_1$ and $Q_4$ are in OFF condition and the switches $Q_2$ and $Q_3$ are in ON condition. Accordingly, the first receiver coil 104a is excited and any receiver device associated with the first receiver coil 104a is charged. Similarly, the third transmitter coil 110c is excited when the switches $Q_5$ and $Q_8$ are in ON/OFF condition during the same time period. Further, the switches $Q_7$ and $Q_6$ are in ON/OFF condition during the same time period and are switched complementary to switching of switches $Q_5$ and $Q_8$. In a similar manner, the fourth transmitter coil 110d is excited when the switches $Q_7$ and $Q_{10}$ are in ON/OFF condition during the same time period. Further, the switches $Q_8$ and $Q_9$ are in ON/OFF condition during same time period and are switched complementary to switching of switches $Q_7$ and $Q_{10}$. Accordingly, the second and the third receiver coils 104b, 104c are also excited.

The second transmitter coil 110b is not excited, since no receiver coil is disposed proximate to the second transmitter coil 110b. Accordingly, voltage across the second transmitter coil 110b has a zero value. Therefore, the switches $Q_3$ and $Q_5$ are in ON/OFF condition during same time period and the switches $Q_4$ and $Q_6$ are in ON/OFF condition during same time period. Further, the switches $Q_4$ and $Q_6$ are switched complementary to switching of the switches $Q_3$ and $Q_5$.

In accordance with the embodiments of the present invention, when a receiver coil is disposed proximate to a corresponding transmitter coil, only the corresponding transmitter coil is excited and other transmitter coils are not excited. Thereby, unnecessary electromagnetic interference and power losses in the transmitter coils are reduced.

Figure 3:
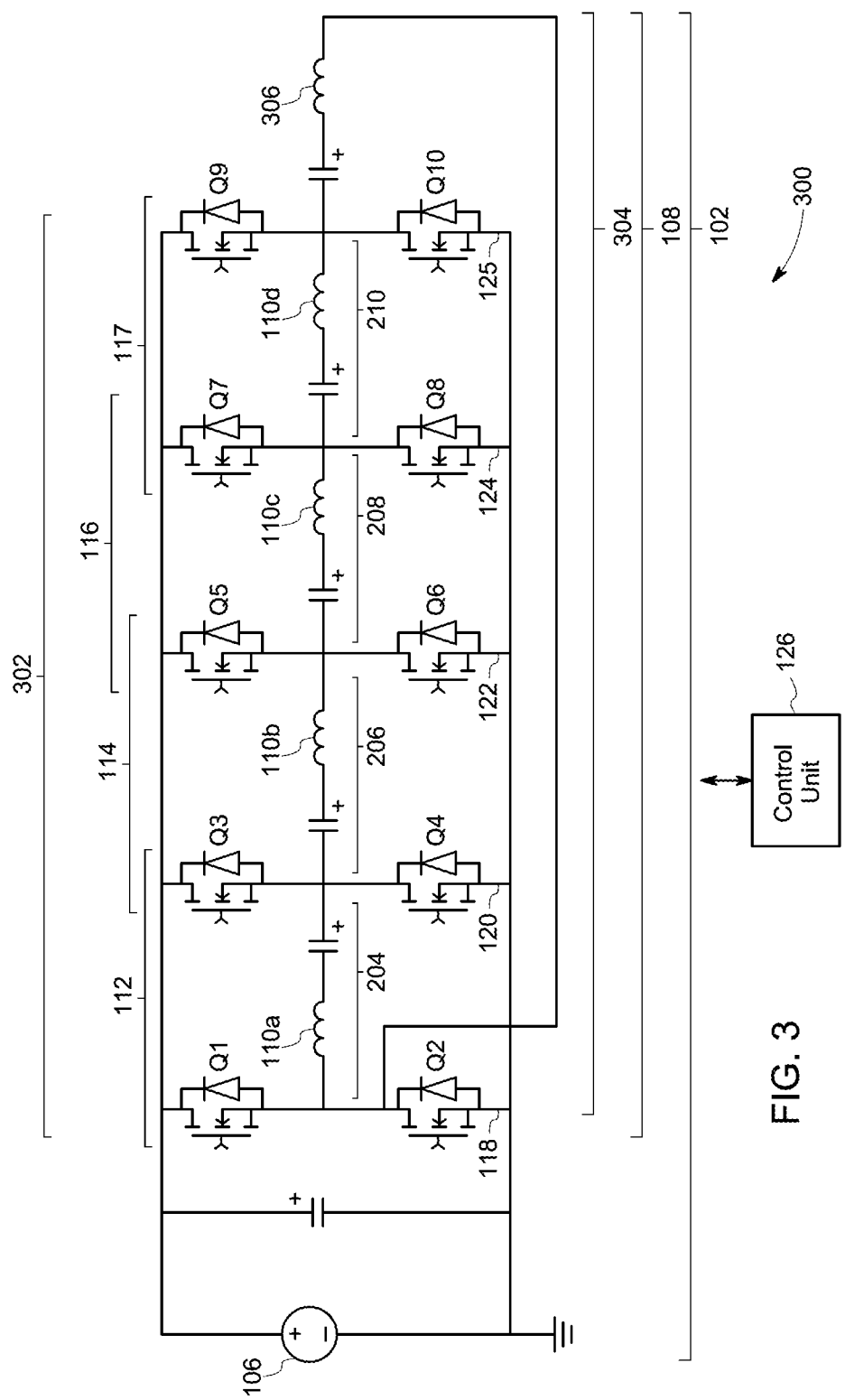
FIG. 3 is a schematic representation of a power transfer system in accordance with yet another embodiment of the present invention.

FIG. 3 is a schematic representation of a power transfer system 300 in accordance with yet another embodiment of the present invention. Particularly, FIG. 3 represents a power transfer system 300, such as a wireless charging system. It should be noted herein that the terms "power transfer system" and "wireless charging system," may be used interchangeably for the reference numeral 300. The wireless charging system 300 includes the power source 106 coupled to the driver unit 108. The driver unit 108 includes the first converter 112, the second converter 114, the third converter 116, the fourth converter 117, and a fifth converter 302. The first converter 112 includes the first leg 118 and the second leg 120. The second converter 114 includes the second leg 120 and the third leg 122. The third converter 116 includes the third leg 122 and the fourth leg 124. Further, the fourth converter 117 includes the fourth leg 124 and the fifth leg 125. The fifth converter 302 includes the fifth leg 125 and the first leg 118.

The second leg 120 is common to the first converter 112 and the second converter 114. The third leg 122 is common to the second converter 114 and the third converter 116. The fourth leg 124 is common to the third converter 116 and the fourth converter 117. The fifth leg 125 is common to the fourth converter 117 and the fifth converter 302. The first leg 118 is common to the first converter 112 and the fifth converter 302. In one embodiment, each of the first converter 112, the second converter 114, the third converter 116, the fourth converter 117, and the fifth converter 302 is a H-bridge circuit. The switches of the first, second, third, fourth and fifth legs 118, 120, 122, 124, 125 are represented by $Q_1$, $Q_2$, $Q_3$, $Q_4$, $Q_5$, $Q_6$, $Q_7$, $Q_8$, $Q_9$, and $Q_{10}$.

The first converter 112 includes the first output terminal 204. Similarly, the second converter 114, the third converter 116, the fourth converter 117, and the fifth converter 302 include the second output terminal 206, the third output terminal 208, the fourth output terminal 210, and a fifth output terminal 304 respectively.

In the illustrated embodiment, the first transmitter coil 110a is coupled at the first output terminal 204. Similarly, the second transmitter coil 110b, the third transmitter coil 110c, the fourth transmitter coil 110d, and a fifth transmitter coil 306 are coupled at the second, third, fourth, and fifth output terminals 206, 208, 210, 304 respectively.

Further, the wireless charging system 300 includes a control unit 126. The control unit 126 is configured to switch the switches $Q_1$, $Q_2$, $Q_3$, $Q_4$, $Q_5$, $Q_6$, $Q_7$, $Q_8$, $Q_9$, and $Q_{10}$. Accordingly, an output parameter is generated at each of the first output terminal 204, the second output terminal 206, the third output terminal 208, the fourth output terminal 210, and the fifth output terminal 304. Accordingly, the first, second, third, fourth and fifth transmitter coils 110a, 110b, 110c, 110d, 306 are selectively excited.

In one embodiment, if there are three receiver coils (not shown in FIG. 3), i.e. a first receiver coil is disposed proximate to the first transmitter coil 110a, a second receiver coil is disposed proximate to the third transmitter coil 110c, and a third receiver coil disposed proximate to the fourth transmitter coil 110d. The switching patterns of the switches of the first converter 112, the second converter 114, the third converter 116, the fourth converter 117, fifth converter 302 are determined based on the position of the receiver coils. Table (2) shows the switching patterns of the switches corresponding to a condition where the first receiver coil is disposed proximate to the first transmitter coil 110a, the second receiver coil is disposed proximate to the third transmitter coil 110c, and the third receiver coil disposed proximate to the fourth transmitter coil 110d. $T_3$ and $T_4$ are time periods in seconds, where $T_3$ and $T_4$ are consecutive periods of time.

TABLE 2

| Time Period | $Q_1$ | $Q_2$ | $Q_3$ | $Q_4$ | $Q_5$ | $Q_6$ | $Q_7$ | $Q_8$ | $Q_9$ | $Q_{10}$ |
|---|---|---|---|---|---|---|---|---|---|---|
| $T_3$ | ON | OFF | OFF | ON | OFF | ON | ON | OFF | OFF | ON |
| $T_4$ | OFF | ON | ON | OFF | ON | OFF | OFF | ON | ON | OFF |

The first transmitter coil 110a is excited when the switches $Q_1$ and $Q_4$ are in ON/OFF condition during same time period. Further, the switches $Q_2$ and $Q_3$ are in ON/OFF condition, the during same time period and are switched complementary to switching of switches $Q_1$ and $Q_4$. In particular, during time period $T_3$, the switches $Q_1$ and $Q_4$ are in ON condition and the switches $Q_2$ and $Q_3$ are in OFF condition. In the subsequent time period, $T_4$, the switches $Q_1$ and $Q_4$ are in OFF condition and the switches $Q_2$ and $Q_3$ are in ON condition. Similarly, the third transmitter coil 110c is excited when the switches $Q_5$ and $Q_8$ are in ON/OFF condition during same time period. Further, the switches $Q_7$ and $Q_6$ are in ON/OFF condition during same time period and are switched complementary to switching of switches $Q_5$ and $Q_8$. In a similar manner, the fourth transmitter coil 110d is excited when the switches $Q_7$ and $Q_{10}$ are in ON/OFF condition during same time period. Further, the switches $Q_8$ and $Q_9$ are in ON/OFF condition during same time period and are switched complementary to switching of switches $Q_7$ and $Q_{10}$.

In the illustrated embodiment, the second transmitter coil 110b and the fifth transmitter coil 306 are desired to be not excited, since no receiver coil is disposed proximate to the second transmitter coil 214 and the fifth transmitter coil 306. Accordingly, voltage across the second transmitter coil 110b and the fifth transmitter coil 306 has a zero value. The switches $Q_3$ and $Q_5$ are in ON/OFF condition during same time period and the switches $Q_4$ and $Q_6$ are in ON/OFF condition during same time period so that the second transmitter coil 110b is not excited. Further, the switches $Q_4$ and $Q_6$ are switched complementary to switching of the switches $Q_3$ and $Q_5$.

As represented in the embodiment of FIG. 3, the patterns of switching of the switches $Q_1$, $Q_2$, $Q_3$, $Q_4$, $Q_5$, $Q_6$, $Q_7$, $Q_8$, $Q_9$, and $Q_{10}$ are determined in order to excite/not excite the first, second, third and fourth transmitter coils 110a, 110b, 110c, 110d. Accordingly, the excitation/non-excitation of the fifth transmitter coil 306 at an instant of time is determined based on the switching patterns of the switches $Q_1$, $Q_2$, $Q_3$, $Q_4$, $Q_5$, $Q_6$, $Q_7$, $Q_8$, $Q_9$, and $Q_{10}$ to excite/not excite the first, second, third and fourth transmitter coils 110a, 110b, 110c, 110d. Therefore, the fifth transmitter coil 306 remains excited even when no receiver coil is present proximate to the fifth transmitter coil 306. In another embodiment, the fifth transmitter coil 306 may not be excited even when a receiver coil is present proximate to the fifth transmitter coil 306.

Figure 4:
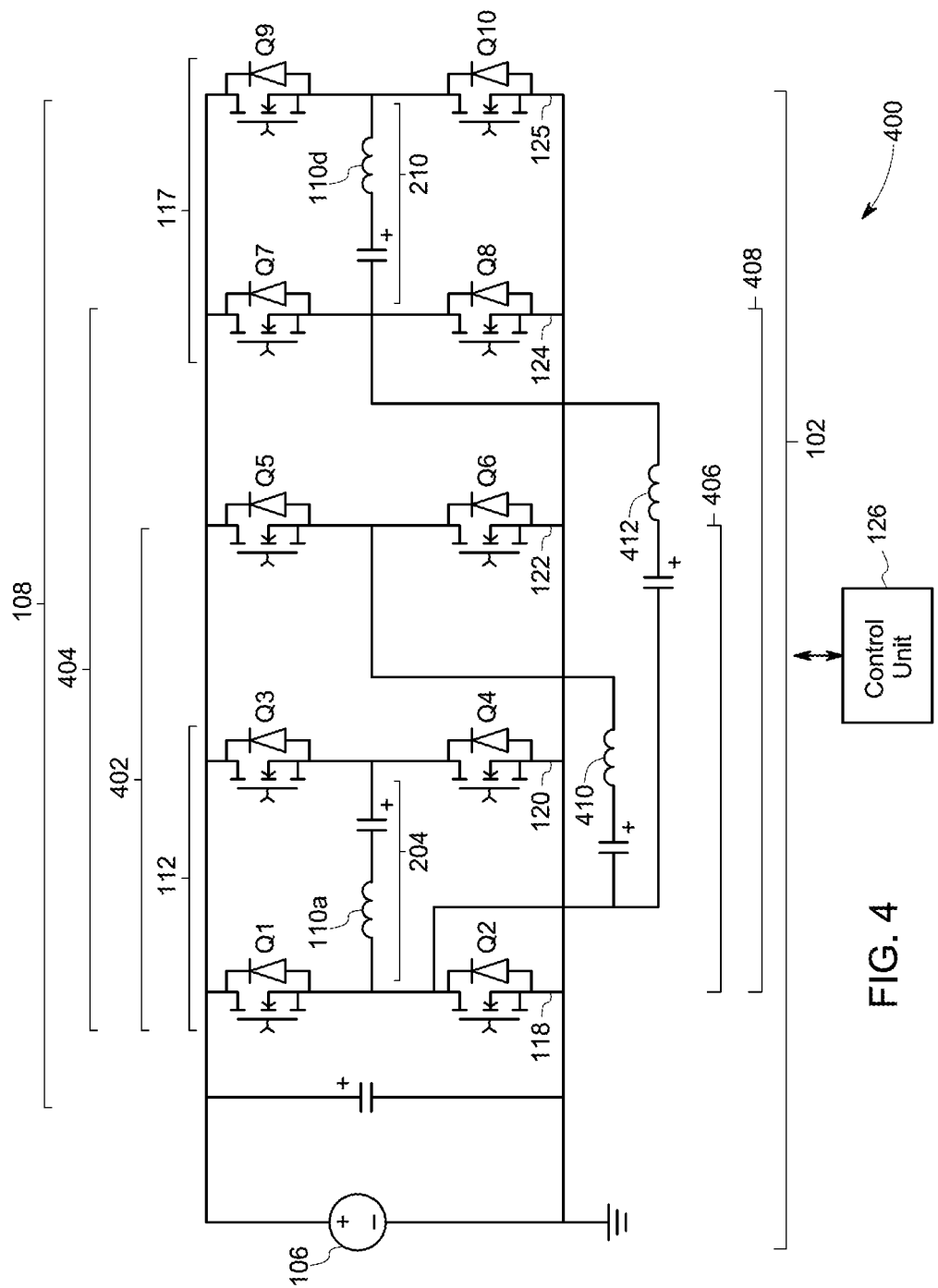
FIG. 4 is a schematic representation of a power transfer system in accordance with yet another embodiment of the present invention.

FIG. 4 is a schematic representation of a power transfer system 400 in accordance with yet another embodiment of the present invention. Particularly, FIG. 4 represents a power transfer system 400, such as a wireless charging system. It should be noted herein that the terms "power transfer system" and "wireless charging system," may be used interchangeably for the reference numeral 400. The wireless charging system 400 includes the power source 106 coupled to the driver unit 108. The driver unit 108 includes the first converter 112, a second converter 402, a third converter 404, and the fourth converter 117. The first converter 112 includes the first leg 118 and the second leg 120. The second converter 402 includes the first leg 118 and the third leg 122. The third converter 404 includes the first leg 118 and the fourth leg 124. The fourth converter 117 includes the fourth leg 124 and the fifth leg 125. The first leg is 118 is common to the first converter 112, the second converter 402, and the third converter 404. The fourth leg 124 is common to the third converter and the fourth converter 117. In one embodiment, each of the first converter 112 the second converter 402, the third converter 404, and the fourth converter 117 is a H-bridge circuit. The switches of the first, second, third, fourth and fifth legs 118, 120, 122, 124, 125 are represented by $Q_1$, $Q_2$, $Q_3$, $Q_4$, $Q_5$, $Q_6$, $Q_7$, $Q_8$, $Q_9$, and $Q_{10}$.

The first converter 112 includes the first output terminal 204. Similarly, the second converter 402, the third converter 404, and the fourth converter 117 include a second output terminal 406, a third output terminal 408, and the fourth output terminal 210 respectively.

In the illustrated embodiment, the first transmitter coil 110a is coupled to the first output terminal 204. Similarly, a second transmitter coil 410, a third transmitter coil 412, and the fourth transmitter coil 110d are coupled at the second, third, and fourth output terminals 406, 408, 210, respectively.

Furthermore, the wireless charging system 400 includes the control unit 126. The control unit 126 is configured to switch the switches $Q_1$, $Q_2$, $Q_3$, $Q_4$, $Q_5$, $Q_6$, $Q_7$, $Q_8$, $Q_9$, and $Q_{10}$. Accordingly, an output parameter is generated at each of the first output terminal 204, the second output terminal 406, the third output terminal 408, and the fourth output terminal 210. Accordingly, the first, second, third, and fourth transmitter coils 110a, 410, 412, 110d are selectively excited.

In one embodiment, there are two receiver coils (not shown in FIG. 4), i.e. a first receiver coil disposed proximate to the first transmitter coil 110a and a second receiver coil disposed proximate to the third transmitter coil 412. The switching patterns of the switches of the first converter 112, the second converter 402, the third converter 404, and the fourth converter 117 are determined based on the position of the receiver coils. Table (3) represents the switching patterns of the switches corresponding to a condition where the first receiver coil is disposed proximate to the first transmitter coil 110a and the second receiver coil is disposed proximate to the third transmitter coil 412. $T_5$ and $T_6$ are time periods in seconds, where $T_5$ and $T_6$ are consecutive periods of time.

TABLE 3

| Time Period | $Q_1$ | $Q_2$ | $Q_3$ | $Q_4$ | $Q_5$ | $Q_6$ | $Q_7$ | $Q_8$ | $Q_9$ | $Q_{10}$ |
|---|---|---|---|---|---|---|---|---|---|---|
| $T_5$ | ON | OFF | OFF | ON | OFF | ON | OFF | ON | OFF | ON |
| $T_6$ | OFF | ON | ON | OFF | ON | OFF | ON | OFF | ON | OFF |

As depicted in table (3), the first transmitter coil 110a is excited when the switches $Q_1$ and $Q_4$ are in ON/OFF condition during same time period. Further, the switches $Q_2$ and $Q_3$ are in ON/OFF condition, during same time period and are switched complementary to switching of $Q_1$ and $Q_4$. Similarly, the third transmitter coil 412 is excited when the switches $Q_1$ and $Q_8$ are in ON/OFF condition during same time period. Further, the switches $Q_2$ and $Q_7$ are in ON/OFF condition during same time period and are switched complementary to switching of switches $Q_1$ and $Q_8$.

In the illustrated embodiment, the second transmitter coil 410 and the fourth transmitter coil 110d are not excited, since no receiver coil is disposed proximate to the second transmitter coil 410 and the fourth transmitter coil 110d. Accordingly, a voltage across the second transmitter coil 410 and the fourth transmitter coil 110d has a zero value. Therefore, the switches $Q_1$ and $Q_5$ are in ON/OFF condition during same time period and the switches $Q_4$ and $Q_6$ are in ON/OFF during same time period. Further, the switches $Q_4$ and $Q_6$ are switched complementary to the switching of the switches $Q_3$ and $Q_5$. Similarly, the switches $Q_7$ and $Q_9$ are in ON/OFF condition during same time period and the switches $Q_8$ and $Q_{10}$ are in ON/OFF condition during same time period. Further, the switches $Q_7$ and $Q_9$ are switched complementary to switching of the switches $Q_8$ and $Q_{10}$.

Figure 5:
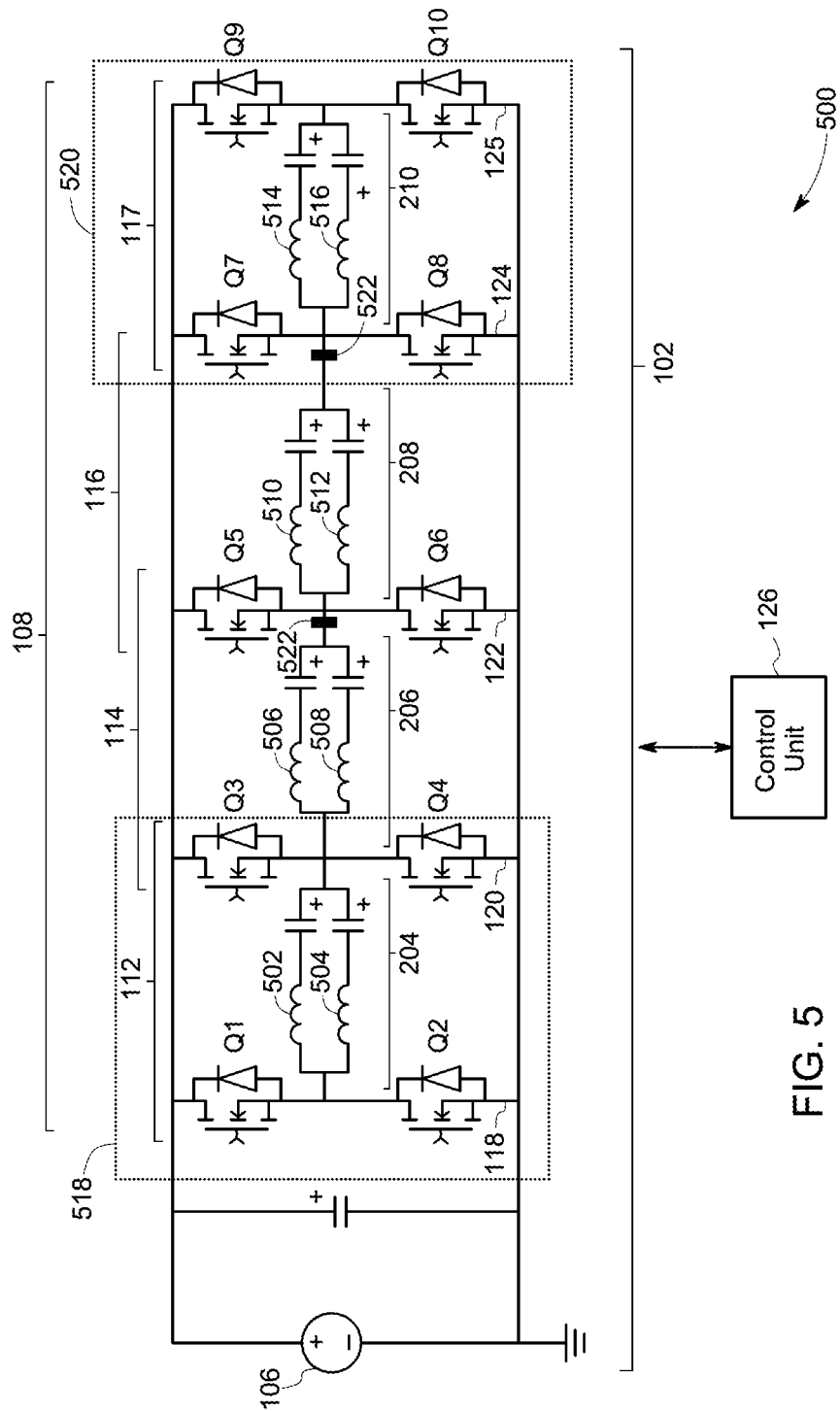
FIG. 5 is a schematic representation of a power transfer system having high frequency transmitter coils and low frequency transmitter coils in accordance with yet another embodiment of the present invention.

FIG. 5 is a schematic representation of a power transfer system 500 in accordance with yet another embodiment of the present invention. Particularly, FIG. 5 represents a power transfer system 500, such as a wireless charging system. It should be noted herein that the terms "power transfer system" and "wireless charging system," may be used interchangeably for the reference numeral 500. In particular, the wireless charging system 500 includes a wireless charging device 102. In one example, the wireless charging device 102 is a universal charging pad. The term "universal charging pad," as used herein, refers to a charging pad which charges receiver devices having high frequency receiver coils and low frequency receiver coils.

The wireless charging system 500 includes the power source 106 coupled to the driver unit 108. The driver unit 108 includes the first converter 112, the second converter 114, the third converter 116, and the fourth converter 117. The first converter 112 includes the first leg 118 and the second leg 120. The second converter 114 includes the second leg 120 and the third leg 122. The third converter 116 includes the third leg 122 and the fourth leg 124. The fourth converter 117 includes the fourth leg 124 and a fifth leg 125. The first, second, third, fourth and fifth legs 118, 120, 122, 124, 125 include the plurality of switches $Q_1$, $Q_2$, $Q_3$, $Q_4$, $Q_5$, $Q_6$, $Q_7$, $Q_8$, $Q_9$, and $Q_{10}$.

Further, the first converter 112, the second converter 114, the third converter 116, and the fourth converter 117 include the first output terminal 204, the second output terminal 206, the third output terminal 208, and the fourth output terminal 210 respectively.

Furthermore, the two transmitter coils are coupled in parallel. In the illustrated embodiment, a first low frequency transmitter coil 502 and a first high frequency transmitter coil 504 are coupled to the first output terminal 204. Similarly, a second low frequency transmitter coil 506 and a second high frequency transmitter coil 508 are coupled to the second output terminal 206. A third low frequency transmitter coil 510 and a third high frequency transmitter coil 512 are coupled to the third output terminal 208. A fourth low frequency transmitter coil 514 and a fourth high frequency transmitter coil 516 are coupled to the fourth output terminal 210.

Further, the wireless charging system 500 includes the control unit 126 configured to switch the switches $Q_1$, $Q_2$, $Q_3$, $Q_4$, $Q_5$, $Q_6$, $Q_7$, $Q_8$, $Q_9$, and $Q_{10}$. In one embodiment, control unit 126 determines a switching frequency of the switches $Q_1$, $Q_2$, $Q_3$, $Q_4$, $Q_5$, $Q_6$, $Q_7$, $Q_8$, $Q_9$, and $Q_{10}$ based on number of high frequency receiver coils and number of low frequency receiver coils. In one embodiment, if the number of high frequency receiver coils is greater than the number of low frequency receiver coils, all the switches $Q_1$, $Q_2$, $Q_3$, $Q_4$, $Q_5$, $Q_6$, $Q_7$, $Q_8$, $Q_9$, and $Q_{10}$ are switched at a high switching frequency. Accordingly, only the high frequency transmitter coils 504, 508, 512, 516 are excited. Similarly, if all the switches $Q_1$, $Q_2$, $Q_3$, $Q_4$, $Q_5$, $Q_6$, $Q_7$, $Q_8$, $Q_9$, and $Q_{10}$ are switched at a low switching frequency, only the low frequency transmitter coils 502, 506, 510, 514 are excited.

In another embodiment, if the number of high frequency receiver coils is equal to the number of low frequency receiver coils, the control unit 126 determines the switching frequency of the switches $Q_1$, $Q_2$, $Q_3$, $Q_4$, $Q_5$, $Q_6$, $Q_7$, $Q_8$, $Q_9$, and $Q_{10}$. In one embodiment, the switches $Q_1$, $Q_2$, $Q_3$, $Q_4$, $Q_5$, $Q_6$, $Q_7$, $Q_8$, $Q_9$, and $Q_{10}$ are switched at a high frequency. In another embodiment, the switches $Q_1$, $Q_2$, $Q_3$, $Q_4$, $Q_5$, $Q_6$, $Q_7$, $Q_8$, $Q_9$, and $Q_{10}$ are switched at a low frequency.

In the illustrated embodiment, the wireless charging device 102 includes a high frequency charging location 518 and a low frequency charging location 520 at both ends respectively. A user may dispose the high frequency receiver coils in the high frequency charging location 518 and the low frequency receiver coils in the low frequency charging location 520. In the illustrated embodiment, the switches $Q_1$, $Q_2$, $Q_3$, $Q_4$ is switched at a high frequency and the $Q_7$, $Q_8$, $Q_9$, and $Q_{10}$ is switched at a low frequency. In one embodiment, in order to switch the switches $Q_1$, $Q_2$, $Q_3$, $Q_4$ in the high frequency charging location 518 at high frequency at the same time when the switches $Q_7$, $Q_8$, $Q_9$, and $Q_{10}$ in the low frequency charging location 520 are switched at low frequency, the high frequency charging location 518 is electrically decoupled from the low frequency charging location 520, by switches 522. Accordingly, in one embodiment, a common leg may be avoided between the high frequency charging location 518 and the low frequency charging location 520.

In accordance with embodiments of the present invention, switching patterns of the switches $Q_1$, $Q_2$, $Q_3$, $Q_4$, $Q_5$, $Q_6$, $Q_7$, $Q_8$, $Q_9$, and $Q_{10}$ is determined by the control unit 126 such that if a particular receiver coil is disposed proximate to a corresponding transmitter coil, the corresponding transmitter coil is excited and other transmitter coils are not excited.

Figure 6:
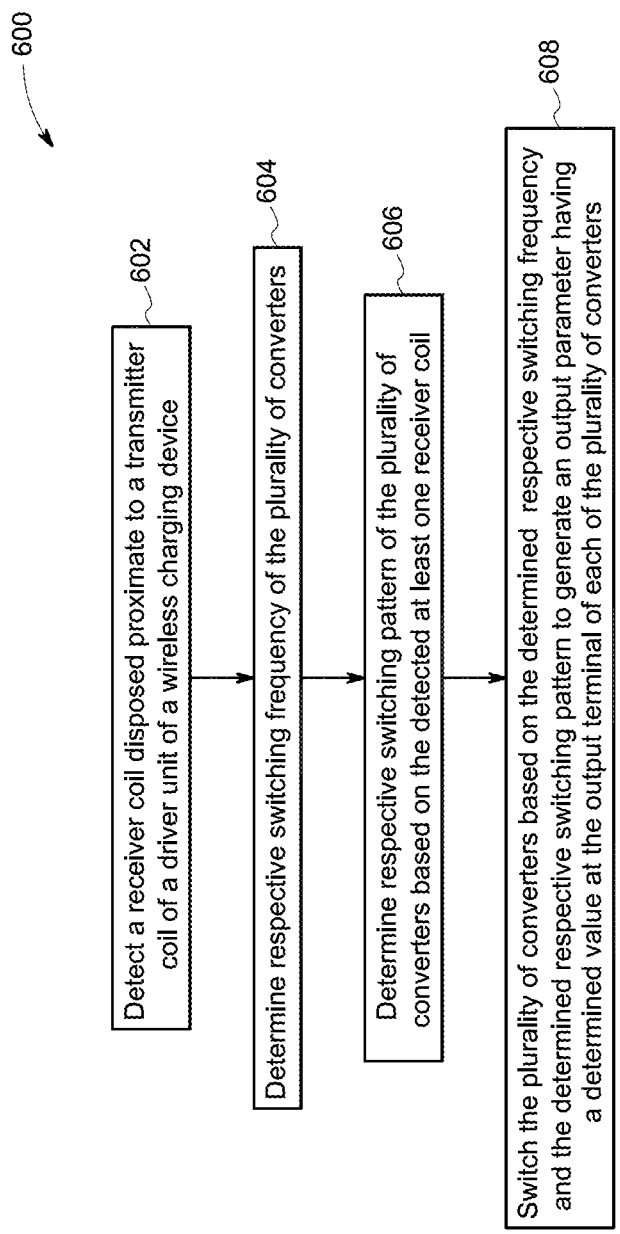
FIG. 6 is a flow chart illustrating a method of operating a power transfer system in accordance with an embodiment of the present invention.

FIG. 6 is a flow chart 600 illustrating a method of operating a power transfer system in accordance with an embodiment of the present invention. In particular, FIG. 6 represents a flow chart 600 illustrating a method of operating a wireless charging system in accordance with an embodiment of the present invention. At step 602, a receiver coil disposed proximate to a transmitter coil of a driver unit of a wireless charging device, is detected. In one embodiment, the number of receiver coils disposed proximate to the transmitter coils of a driver unit of a wireless charging device is determined. In another embodiment, the position of each receiver coil with respect to a corresponding transmitter coil may be determined. In yet another embodiment, the type of receiver coils disposed proximate to corresponding transmitter coils of the wireless charging device may be determined. Different types of receiver coils include a high frequency receiver coil and a low frequency receiver coil.

Further, at step 604, a corresponding switching frequency of each of the plurality of converters is determined. In one embodiment, the corresponding switching frequency of each of the plurality of converters is determined based on a detected receiver coil. In particular, the corresponding switching frequency of each of the plurality of converters is determined based on the type of a receiver coil. When the high frequency receiver coil is disposed proximate to a transmitter coil, a corresponding converter is switched at high frequency.

In another embodiment, the switching frequencies of the plurality of converters is determined based on number of high frequency receiver coils and low frequency receiver coils disposed proximate to the wireless charging device. As noted hereinabove, in one embodiment, the wireless charging device includes a corresponding low frequency transmitter coil and a high frequency transmitter coil coupled to an output terminal of each of the plurality of converters. If the number of high frequency receiver coils is greater than the number of low frequency receiver coils, all the switches $Q_1$, $Q_2$, $Q_3$, $Q_4$, $Q_5$, $Q_6$, $Q_7$, $Q_8$, $Q_9$, and $Q_{10}$ are switched at a high switching frequency. Accordingly, only the high frequency transmitter coils of the wireless charging system are excited. In another embodiment, if the number of high frequency receiver coils is equal to the number of low frequency receiver coils, the control unit determines the switching frequency of the switches $Q_1$, $Q_2$, $Q_3$, $Q_4$, $Q_5$, $Q_6$, $Q_7$, $Q_8$, $Q_9$, and $Q_{10}$.

In yet another embodiment, if both the high frequency and low frequency receiver coils are disposed proximate to the wireless charging device, the switches $Q_1$, $Q_2$, $Q_3$, $Q_4$, $Q_5$, $Q_6$, $Q_7$, $Q_8$, $Q_9$, and $Q_{10}$ are alternatively switched at a low frequency and high frequency. For example, the switches $Q_1$, $Q_2$, $Q_3$, $Q_4$, $Q_5$, $Q_6$, $Q_7$, $Q_8$, $Q_9$, and $Q_{10}$ are switched at low frequency during time period $T_7$, at high frequency during time period $T_8$, again at low frequency during time period $T_9$, and so on, till only one type of receiver coils are disposed proximate to the wireless charging device. The time periods $T_7$, $T_8$, and $T_9$ are consecutive periods of time.

Further, at step 606, a corresponding switching pattern of each of the plurality of converters is determined based on the detected receiver coil. Particularly, in one embodiment, the plurality of converters is switched based on the position of the receiver coil with respect to the transmitter coils. If a receiver coil is disposed proximate to a particular transmitter coil, the corresponding transmitter coil is excited.

At step 608, the plurality of converters is switched based on the determined switching frequencies and the determined switching patterns to generate an output parameter at the output terminal of each of the plurality of converters. In one embodiment, the output parameter may be an alternating current (AC) electrical parameter, such as voltage or current. In one embodiment, the output parameter may have a zero value. In another embodiment, the output parameter may be a voltage having a determined value. The transmitter coils are selectively excited based on the output parameter generated at each of the output terminals.

The exemplary process steps discussed herein may be implemented by suitable codes on a processor-based system such as a general-purpose or special-purpose computer. It should also be noted herein that different exemplary implementations may perform some or all of the steps described herein in different orders or substantially concurrently. Furthermore, the functions may be implemented using a plurality of programming languages including but not limited to C++ or Java. Such codes may be stored or adapted for storage on one or more tangible, machine readable media such as on data repository chips, local or remote hard disks, optical disks (that is, CDs or DVDs), memory or other media, which may be accessed by a processor-based system to execute the stored codes. The tangible media may include paper or another suitable medium upon which instructions are printed. For instance, the instructions may be electronically captured via optical scanning of the paper or other medium, then compiled, interpreted or otherwise processed in a suitable manner if necessary, and then stored in a data repository or a memory device.

In accordance with the embodiments discussed herein, an exemplary power transfer system having a plurality of converters and a method of operating the power transfer system for selectively exciting transmitter coils based on presence of a receiver coil are disclosed. The selective excitation of transmitter coils prevents unnecessary excitation of all transmitter coils. Un-necessary electromagnetic interference, power loss, and generation of hot spots in the power transfer system are reduced. Further, power electronics is shared between the plurality of converters. Accordingly, the power electronics employed in the power transfer system are considerably reduced.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

The invention claimed is:
1. A power transfer device comprising:
 a driver unit comprising:
  a plurality of converters comprising a plurality of legs coupled to each other, wherein at least one leg of each of the plurality of converters is common to another converter of the plurality of converters, and wherein each of the plurality of converters comprises an output terminal; and
  a plurality of transmitter coils, wherein each transmitter coil of the plurality of transmitter coils is coupled to a respective output terminal of the plurality of converters, wherein the plurality of transmitter coils includes at least one low frequency transmitter coil and at least one high frequency transmitter coil.

2. The power transfer device of claim 1, wherein each of the plurality of legs comprises a plurality of semiconductor switches.

3. The power transfer device of claim 1, wherein the driver unit is coupled to a direct current (DC) source, and wherein the driver unit is configured to convert a DC electrical parameter to an alternating current (AC) electrical parameter having a determined frequency.

4. The power transfer device of claim 3, wherein the driver unit is configured to excite the a transmitter coil of the plurality of transmitter coils based on the AC electrical parameter having the determined frequency.

5. A power transfer system comprising:
a power transfer device comprising:
a driver unit, wherein the driver unit comprises: a plurality of converters comprising a plurality of legs coupled to each other, wherein at least one leg of each of the plurality of converters is common to another converter of the plurality of converters, and wherein each of the plurality of converters comprises an output terminal; and
a plurality of transmitter coils, wherein each transmitter coil of the plurality of transmitter coils is coupled to a respective output terminal of the plurality of converters, wherein the plurality of transmitter coils includes at least one low frequency transmitter coil and at least one high frequency transmitter coil; and
a control unit coupled to the driver unit, wherein the control unit is configured to regulate switching of the driver unit.

6. The power transfer system of claim 5, further comprising a switch configured to couple ones of the plurality of transmitter coils to the respective output terminals of the plurality of converters.

7. The power transfer system of claim 6, wherein the power transfer device comprises at least one of a high frequency charging location and a low frequency charging location, wherein the high frequency charging location is electrically decoupled from the low frequency charging location using the switch.

8. The power transfer system of claim 5, wherein at least one transmitter coil of the plurality of transmitter coils is configured to power at least one receiver coil.

9. The power transfer system of claim 5, further comprising a DC source coupled to the driver unit.

10. A method of operating a power transfer system, the method comprising:
detecting, by a control unit, at least one receiver coil disposed proximate to a power transfer device, wherein a driver unit of the power transfer device comprises a plurality of converters comprising a plurality of legs coupled to each other, wherein at least one leg of each of the plurality of converters is common to another converter of the plurality of converters, wherein each of the plurality of converters comprises an output terminal, wherein the power transfer device includes a plurality of transmitter coils coupled to respective output terminals of the plurality of converters, and wherein the plurality of transmitter coils includes at least one low frequency transmitter coil and at least one high frequency transmitter coil;
determining, by the control unit, respective switching frequencies of the plurality of converters;
determining, by the control unit, respective switching patterns of the plurality of converters based on the detected at least one receiver coil; and
switching, by the control unit, the plurality of converters based on the determined respective switching frequencies and the determined respective switching patterns to generate an output parameter having a determined value at the output terminal of each of the plurality of converters.

11. The method of claim 10, wherein switching the plurality of converters comprises switching a plurality of semiconductor switches of each of the plurality of legs.

12. The method of claim 10, wherein the output parameter comprises an alternating current (AC) electrical parameter.

13. The method of claim 12, further comprising exciting at least one transmitter coil of the plurality of transmitter coils based on the determined value of the alternating current (AC) electrical parameter.

14. The method of claim 13, further comprising powering the at least one receiver coil of the plurality of transmitter coils based on excitation of the at least one transmitter coil.

15. The method of claim 12, further comprising deactivating at least one transmitter coil of the plurality of transmitter coils based on the output parameter having the determined value.

16. The method of claim 10, further comprising decoupling at least one transmitter coil of the plurality of transmitter coils from the driver unit.

17. The method of claim 10, wherein the respective switching frequencies comprises at least one high frequency for use with the at least one high frequency transmitter coil and at least one low frequency for use with the at least one low frequency transmitter coil.

18. The method of claim 10, further comprising determining the respective switching frequencies of the plurality of converters based on the detected at least one receiver coil.

* * * * *